US009164542B2

(12) United States Patent
Tilley et al.

(10) Patent No.: US 9,164,542 B2
(45) Date of Patent: Oct. 20, 2015

(54) AUTOMATED CONTROLS FOR SENSOR ENABLED USER INTERFACE

(75) Inventors: Patrick Tilley, Coram, NY (US); James Morley-Smith, High Wycombe (GB); Dan Sadler, Gilbert, AZ (US)

(73) Assignee: Symbol Technologies, LLC, Holtsville, NY (US)

( * ) Notice: Subject to any disclaimer, the term of this patent is extended or adjusted under 35 U.S.C. 154(b) by 343 days.

(21) Appl. No.: 12/872,187

(22) Filed: Aug. 31, 2010

(65) Prior Publication Data

US 2012/0054620 A1 Mar. 1, 2012

(51) Int. Cl.
| | |
|---|---|
| *G06F 3/033* | (2013.01) |
| *G06F 3/00* | (2006.01) |
| *G06F 3/16* | (2006.01) |
| *G06F 1/16* | (2006.01) |
| *G06F 3/01* | (2006.01) |
| *G06F 3/0346* | (2013.01) |
| *G06F 3/0481* | (2013.01) |
| *G06F 3/0488* | (2013.01) |

(52) U.S. Cl.
CPC .......... *G06F 1/1626* (2013.01); *G06F 1/1694* (2013.01); *G06F 3/017* (2013.01); *G06F 3/0346* (2013.01); *G06F 3/04817* (2013.01); *G06F 3/04883* (2013.01)

(58) Field of Classification Search
None
See application file for complete search history.

(56) References Cited

U.S. PATENT DOCUMENTS

| | | | | |
|---|---|---|---|---|
| 5,252,951 | A * | 10/1993 | Tannenbaum et al. | 345/156 |
| 6,057,845 | A * | 5/2000 | Dupouy | 715/863 |
| 6,072,467 | A * | 6/2000 | Walker | 345/157 |
| 6,268,857 | B1 * | 7/2001 | Fishkin et al. | 715/863 |
| 6,668,177 | B2 * | 12/2003 | Salmimaa et al. | 455/566 |
| 7,030,861 | B1 * | 4/2006 | Westerman et al. | 345/173 |
| 7,280,096 | B2 | 10/2007 | Marvit et al. | |
| 7,600,192 | B1 * | 10/2009 | Hashimoto et al. | 715/802 |
| 2006/0017692 | A1 | 1/2006 | Wehrenberg et al. | |
| 2006/0143574 | A1 * | 6/2006 | Ito et al. | 715/800 |
| 2006/0281453 | A1 | 12/2006 | Jaiswal et al. | |
| 2007/0161874 | A1 | 7/2007 | Aerts | |
| 2007/0177803 | A1 * | 8/2007 | Elias et al. | 382/188 |
| 2009/0077501 | A1 * | 3/2009 | Partridge et al. | 715/846 |
| 2009/0079701 | A1 * | 3/2009 | Grosskopf, Jr. | 345/173 |
| 2009/0265671 | A1 * | 10/2009 | Sachs et al. | 715/863 |
| 2009/0276730 | A1 | 11/2009 | Aybes et al. | |
| 2009/0303204 | A1 * | 12/2009 | Nasiri et al. | 345/184 |
| 2009/0319894 | A1 * | 12/2009 | Markiewicz et al. | 715/702 |
| 2010/0042954 | A1 * | 2/2010 | Rosenblatt et al. | 715/863 |
| 2010/0070926 | A1 | 3/2010 | Abanami et al. | |

(Continued)

FOREIGN PATENT DOCUMENTS

| | | |
|---|---|---|
| WO | 02088853 A1 | 11/2002 |
| WO | 2010076772 A2 | 7/2010 |

OTHER PUBLICATIONS

International Search Report and Written Opinion for International Application No. PCT/US2011/047713 mailed on Dec. 29, 2011.

(Continued)

*Primary Examiner* — Stephen Alvesteffer

(57) ABSTRACT

A mobile unit includes a processor, a memory, and a display. The display shows a user interface including a plurality of commands. Each sensory activated command of the plurality of commands is shown with a respective icon indicative of at least one of a motion and an orientation assigned to the sensory activated command.

19 Claims, 3 Drawing Sheets

(56) References Cited

U.S. PATENT DOCUMENTS

| | | | |
|---|---|---|---|
| 2010/0095249 A1* | 4/2010 | Yoshikawa et al. | 715/856 |
| 2010/0108756 A1* | 5/2010 | Denis | 235/375 |
| 2010/0275159 A1* | 10/2010 | Matsubara et al. | 715/810 |
| 2010/0333044 A1* | 12/2010 | Kethireddy | 715/863 |
| 2011/0053641 A1* | 3/2011 | Lee et al. | 455/556.1 |
| 2011/0054830 A1* | 3/2011 | Logan | 702/141 |
| 2011/0081923 A1* | 4/2011 | Forutanpour et al. | 455/457 |
| 2011/0214082 A1* | 9/2011 | Osterhout et al. | 715/773 |
| 2011/0254792 A1* | 10/2011 | Waters et al. | 345/173 |
| 2013/0120279 A1* | 5/2013 | Plichta et al. | 345/173 |

OTHER PUBLICATIONS

Office Action dated Dec. 31, 2013 in related Canada application 2,809,297.

English translation of Office Action dated May 7, 2015 in related China application 201180042166.4.

Office Action dated Aug. 7, 2014 in related Europe patent application 11 749 050.8 1953.

English translation of Office Action dated Feb. 20, 2013 in related Korea patent application 10-2013-7008254.

* cited by examiner

AUTOMATED CONTROLS FOR SENSOR ENABLED USER INTERFACE

BACKGROUND

A mobile unit (MU) may include a rich user interface to enable a user to activate a control of the MU. However, activating controls of the MU is often a two-handed operation in that if a control on the display needs to be accessed, a second hand is needed to activate that control either by a finger or a stylus. Conventional MUs include a variety of different methods to enter an input. For example, the MU may include a keypad to enter inputs. In another example, the MU may include motion and/or orientation sensors to detect a motion and/or orientation that corresponds to an entry of an input.

Although using motion sensors to detect motion that corresponds to an entry of an input is known, conventional MUs do not include any indication which controls the possible actions. For example, in a browser application with Internet connectivity (e.g., web page), a user may not know the action that activates a particular command or may even be completely unaware that a certain action activates a command. Accordingly, a user may not be able to fully utilize all available options or may inadvertently perform an action that is undesired.

SUMMARY OF THE INVENTION

The exemplary embodiments describe a mobile unit including a processor, a memory, and a display. The display shows a user interface including a plurality of commands. Each sensory activated command of the plurality of commands is shown with a respective icon indicative of at least one of a motion and an orientation assigned to the sensory activated command.

DETAILED DESCRIPTION

Figure 1:
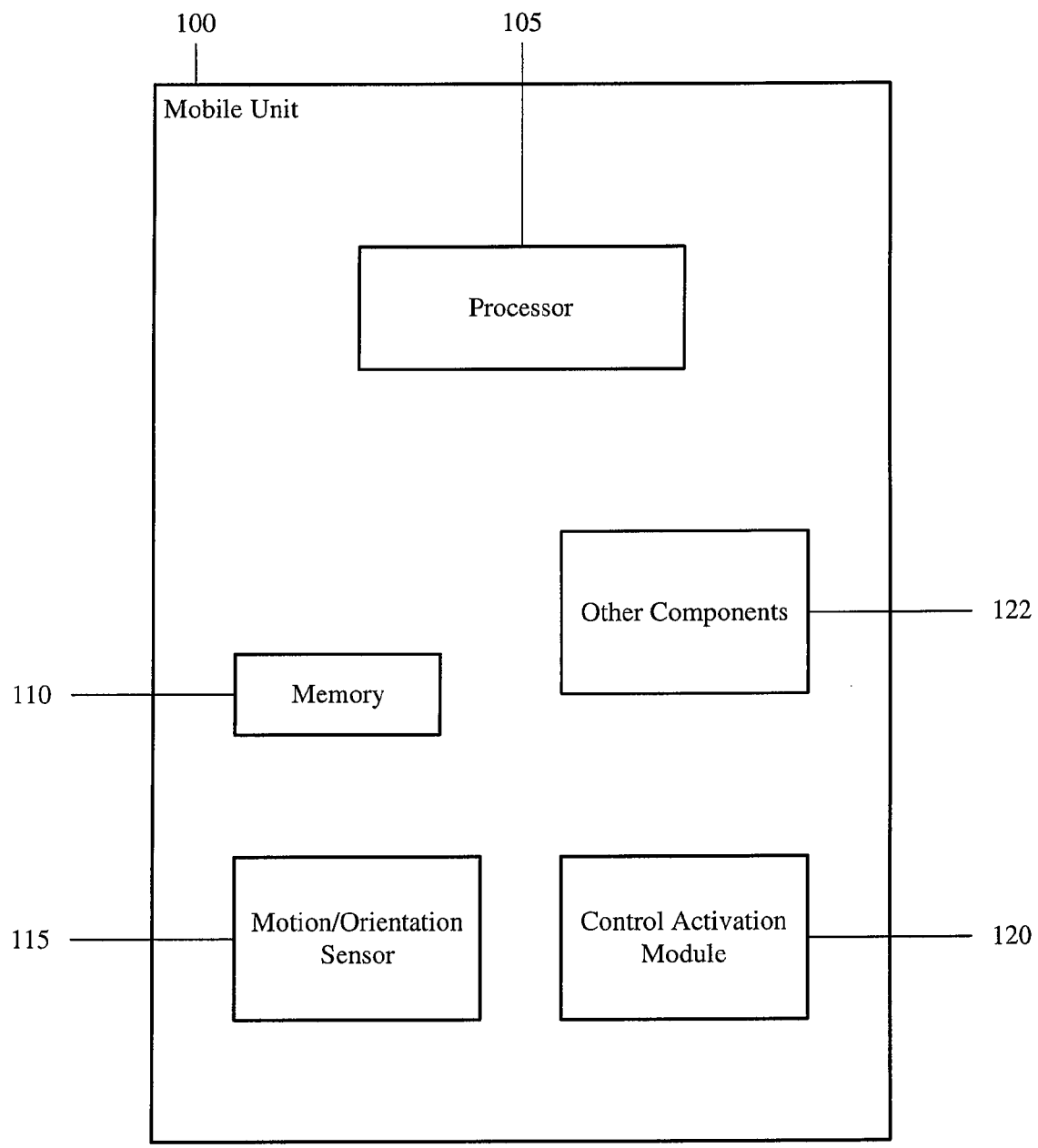
FIG. 1 shows components of a mobile unit according to an exemplary embodiment.

The exemplary embodiments may be further understood with reference to the following description and the appended drawings, wherein like elements are referred to with the same reference numerals. The exemplary embodiments describe a mobile unit with a display configured to show icons representative of motions and/or orientations that activate a command. Specifically, the motions are represented as the icons in conjunction with the action to indicate to a user that performing the motion results in activating the command. The exemplary embodiments further describe a development environment in which to develop applications that incorporate the sensory activated commands. The mobile unit, the display, the motions and/or orientations, the icons, the development environment, and a related method will be discussed in further detail below.

FIG. 1 shows components of a mobile unit (MU) 100 according to an exemplary embodiment. The MU 100 may be any electronic device that is portable. The components of the MU 100 may include a processor 105, a memory 110, a motion and/or orientation sensor 115, and a control activation module 120. It should be noted that the MU 100 may include a variety of other conventional components represented as other components 122. For example, the other components 122 may include a power supply, a keypad, an input receiver, ports to connect to other devices, a wireless transceiver, a speaker, etc.

The processor 105 may provide conventional functionalities for the MU 100. For example, the MU 100 may include a plurality of applications that are executed on the processor 105. In particular, the MU 100 may include an application including a web browser when connected to a network via the wireless transceiver. The memory 110 may also provide conventional functionalities for the MU 100. For example, the memory 110 may store data related to operations performed by the processor 105. In particular, the memory 110 may store a plurality of motions and/or orientations and associations of the motions and/or orientations.

The motion and/or orientation sensors 115 may be any conventional device that is configured to receive and interpret motion and/or orientation data. For example, the motion and/or orientation sensor 115 may include an accelerometer for motion and a magnetometer for orientation. The accelerometer may measure proper acceleration on single or multiple axes to detect magnitude and direction of acceleration being experienced by the MU 100 as a vector quantity. Accordingly, the motion sensor 115 being an accelerometer may be used to sense orientation with or without the aid of the magnetometer or a gyroscope, acceleration, vibration shock, falling, etc. In another example, the motion sensor 115 may be associated with a touch screen display. The motion sensor 115 may receive an initial touch data, an interim touch data, and an end touch data. The motion sensor 115 may then extrapolate the motion performed on the touch screen display. It should be noted that the motion and/or orientation sensor 115 may also be other types of known devices that detect motion and/or orientation and may also be any combination of these devices.

The control activation module (CAM) 120 may be hardware, software, a combination thereof, or an extension of the memory 110. For example, the CAM 120 may be a library or repository for motion and/or orientation related information. Thus, if the motion sensor 115 detects a turning motion, the CAM 120 may include a list of actions with associated motions and/or orientations to determine which action the turning motion is associated therewith. The processor 105 may access the CAM 120 to determine the corresponding action to perform.

Motion gesture detection is well known in the art and may be performed by a variety of known methods such as Hidden Markov Models (HMM), Decision Trees, and Dynamic Time Warping (DTW), etc. Regardless of the method, some amount of training data is required prior to system deployment to create standard gesture templates for the chosen set of motion gestures. Then during normal usage, real-time motion data is compared with these templates to determine whether or not a recognized gesture has occurred. Also prior to deployment, it is useful to generate a confusion matrix which shows the likelihood that one gesture will be confused with another. This information could then be provided to application developers to provide insight as to which gestures may cause issues with regard to system confusion when they are used together.

In a preferred embodiment, dynamic time warping is used to compare a current motion string to a plurality of motion templates stored on the device in order to determine if the current string is a close match to any known motion template. If a match is detected above a certain threshold, then the motion gesture is considered to be detected. This threshold may either be hard coded or user adjustable. With regard to motion templates, these may be discovered and pre-programmed by the device manufacturer or software developer through standard machine learning training methods. Such templates may be static or they may be adaptable through more advanced algorithms which learn the preferences of a specific user or group of users. Templates could also be recorded by users and stored on the device to represent personalized motions, gestures, or orientations.

According to the exemplary embodiments, the CAM 120 may include a list of associations of icons that represent various motions and/or orientations that are assigned to select commands for a plurality of user interfaces. The processor 105 may access the CAM 120 to load a user interface appropriately with the proper icons being displayed for the select commands. For example, if an application is initiated by a user, an interface of the application may include various operations that may be performed. The CAM 120 may store the list of any of the various operations which includes an associated motion and/or orientation that triggers the action. The processor 105 may subsequently show the icon of the motion for the motion triggered action to indicate to a user the respective motions as a function of the CAM 120. Thus, an icon of the command may further include a motion and/or orientation icon as will be discussed in further detail below.

Figure 2:
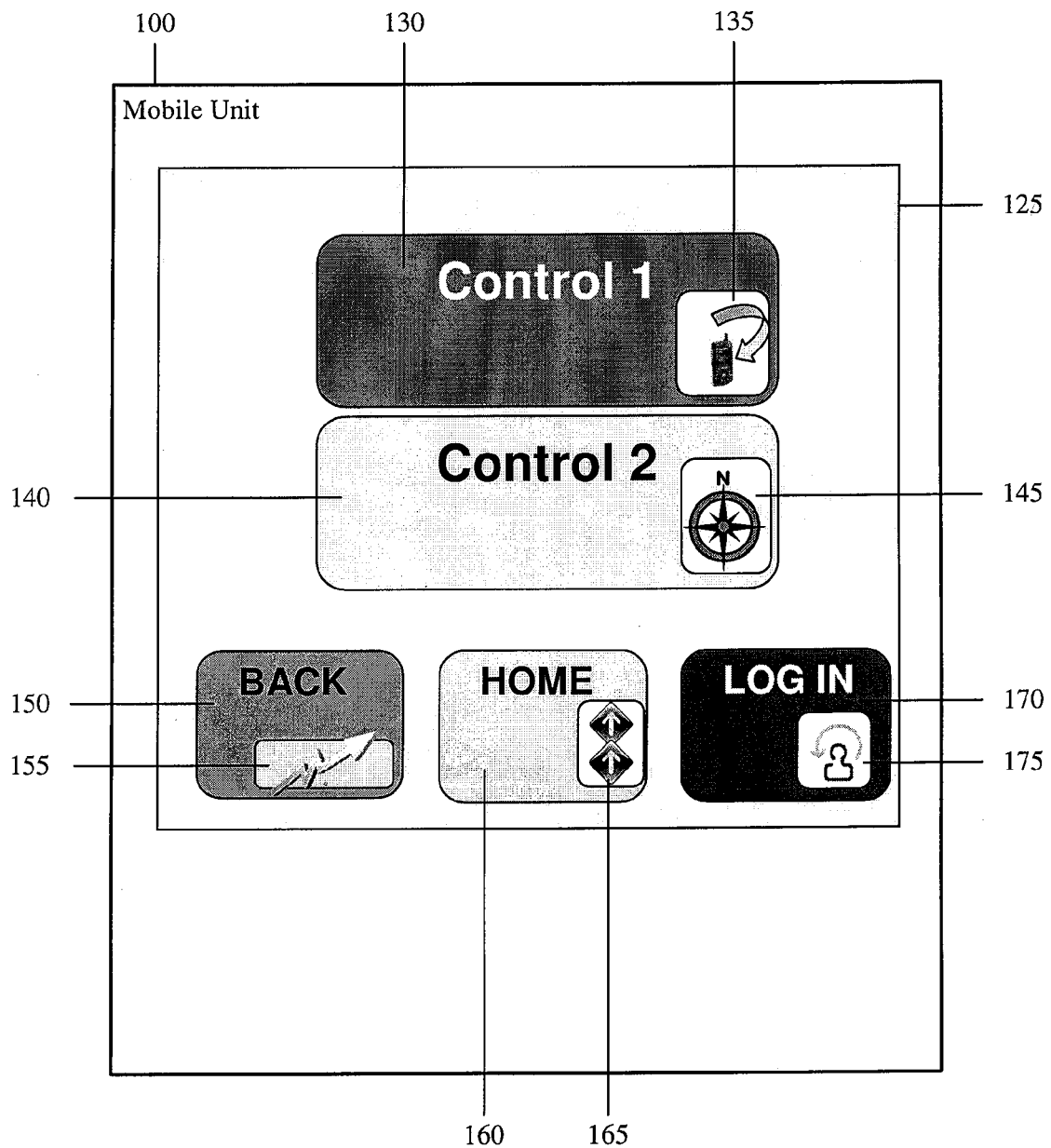
FIG. 2 shows the mobile unit of FIG. 1 including a display according to an exemplary embodiment.

FIG. 2 shows the MU 100 of FIG. 1 including a display 125 according to an exemplary embodiment. Specifically, the MU 100 is an exemplary user interface of a browser application. The display 125 illustrates the various motions and/or orientations that may be performed to execute an associated action. As shown, a first control 130 may include an icon 135 that indicates the associated motion and/or orientation. The icon 135 shows that if the MU 100 is rolled to the right, the first control 130 will be performed. A second control 140 may include an icon 145 that indicates the associated motion and/or orientation. The icon 145 shows that if the MU 100 is faced north, the second control 140 will be performed. A back command 150 may include an icon 155 that indicates the associated motion. The icon 155 shows that if the MU 100 is shaken to the right, the back command 150 is performed. A home command 160 may include an icon 165 that indicates the associated motion. The icon 165 shows that if the MU 100 is shaken up and down, the home command 160 is performed. A log in command 170 may include an icon 175 that indicates the associated motion. The icon 175 shows that if a personal gesture (e.g., a 180 degree counterclockwise rotation of MU 100) is done, the log in command 170 is performed.

According to the exemplary embodiments, the motions and the icons may be default settings and/or determined by user preference. For example, the CAM 120 may include a list of default icons and associated motions and/or orientations specified for the user interface shown on the display 125. As shown in the display 125 of FIG. 2, the icons 135, 145, 155, and 165 may be default icons. These default icons may be user intuitive symbols in which any user who views the default icon is able to determine the associated motion and/or orientation. The list of default icons may include other available icons that may be used to associate with other actions to be taken that the user may assign thereto. For example, the icon 175 may be selected by the user from the list of default icons in which the motion is rotating counterclockwise.

The icons may also be user created. That is, the CAM 120 may also include an application run by the processor 105 in which the user may create an icon. The created icon may then be associated with a motion and/or orientation determined by the user. The CAM 120 may include a list of available motions and/or orientations that may be associated with the created icon. Subsequently, the user may associate the created icon with an action. When the action is part of a user interface, the processor 105 may access the CAM 120 to show the icon with the action. Thus, when the motion and/or orientation is performed, the action may also be performed. Furthermore, the user selected icon and/or the user created icon may be associated with user created motions and/or orientations. For example, the application to create the icon may also enable the user to generate a motion or an orientation that is stored. The user may subsequently associate the user created motion or orientation with the icon.

The assignment of motions and/or orientations to a command as well as association of an icon may rest with the user (as described above) and/or may rest with developers (as is the case for the default assignments). The developers may also assign motions and/or orientations to a command with an icon for user interfaces that may potentially change. For example, a web page may be loaded on the display 125. The web page is controlled by the developers of that page. The developers may assign the various motions and/or orientations to select one of the commands and also assign a respective icon for each motion and/or orientation. The MU 100 that is capable of receiving motion and/or orientation data (e.g., via the motion and/or orientation sensor 115) may show the icons to indicate to the user which commands are motion activated. Thus, when the web page is loaded, motion and/or orientation data may be used to navigate.

As discussed above, the exemplary embodiments may further be used with a development environment. The web page design described above may embody one example of the development environment. During the development of an application, commands may be assigned motions and/or orientations that execute the commands. Furthermore, the developer may assign respective icons that represent the motions and/or orientations used to execute the commands. The developer may access a substantially similar library of motions, orientations, and icons as described above. In addition, the library may include developer exclusive icons that are only assignable at the developer level. Furthermore, the library of icons may be filtered (both on the developer and user level) as a function of a number of sensory activated commands. For example, when at least two motions and/or orientations have a possibility of being registered concurrently from a single action, the motions and/or orientations may be prevented from being associated to commands that are present on a single interface. The developer environment may provide a mechanism for loading a recognition template that corresponds to a selected sensory input chosen by a developer that is associated with a command.

The developer environment may also enable a developer to include the further options discussed above and below herein. For example, the developer may enable an application that allows a user to create icons or alter a command to become sensory activated. In another example, the developer may enable a momentary preview of icons as cues to the user. Thus, whether an icon representing the motion and/or orientation is shown or not, the momentary preview may be used to temporarily show the icon, temporarily generate a larger image of the icon, etc.

With options being enabled for a user to control, the developer may initially associate templates with particular applications and commands of the applications. For example, given an application or more particularly a command of the application, a gesture template may be associated therewith. Thus, when a user enables a command to be sensory activated, a selection may be made from the gesture template.

The available motions, orientations, recognition events, etc. may be categorized into sets, subsets, class types, etc. such as a shake type, a tilt type, an orientation type, etc. The templates that are designated for select applications may be associated with the category or subsets of available sensory inputs. Thus, the developer environment may further enable particular sets of sensory inputs to be associated with predetermined applications. Therefore, a menu of motions, orientations, icons, etc. may be filtered for an application as a function of the association with the templates and the class types for the application.

It should be noted that the CAM 120 may include other functionalities. In a first example, the CAM 120 may include features to assist a user. For example, audio cues may be used to inform a user as to which motions and/or orientations are associated with activating a command. In such a feature, the audio cue may play a voice file that states the motion and/or orientation associated with the action. Thus, in a first scenario, when a user physically performs the motion and/or orientation, the voice file may state the motion and/or orientation being performed to, for example, serve as a check that the user will perform a desired action. In a second scenario, when a user selects an icon, the voice file may state the motion and/or orientation associated with the icon. It should be noted that the icon may also include a graphical written indication of the motion and/or orientation.

It should also be noted that the MU 100 may include further sensors that determine other sensed conditions such as environmental, biological, electromagnetic, etc. recognition events. Thus, the CAM 120 may further consider these other sensed conditions as a factor to perform an action. It should be noted that these other sensed conditions may be used in concert with the motion and/or orientation sensor 115 or individually to perform an action.

It should further be noted that the MU 100 may include other input receivers such as a mouse, stylus, touch input, etc. to be used in concert with the motions and/or orientations. For example, certain icons may show that the other input is required in conjunction with the motion and/or orientation to activate the command. In a specific example, the icon 145 indicates when the MU 100 is faced north, the action is performed. The icon 145 may also include an option where the user is required to hold the command button 140 on the interface with, for example, the touch input so that when the command button 140 is pressed with the MU 100 facing north, the action is performed. In another example, the concert use of the other input and the motion and/or orientation may be dynamic. That is, in a specific example, a motion and/or orientation may only become available to activate a command after another action is performed/sensed.

The MU 100 may be user friendly so that particular sensors may be enabled/disabled according to the user preference. For example, if the MU 100 is in an environment where multiple motions or orientation events are experienced that may interfere with desired actions to be taken, the user may disable the motion and/or orientation sensor 115 and only enable other sensors (e.g., mouse/stylus). In another example, if the user is required for one-handed use of the MU 100, the user may disable the other sensors and only enable the motion and/or orientation sensor 115.

As discussed above, other input receivers such as a mouse/stylus may be used with the MU 100. The CAM 120 may include other features that are used in conjunction with these other input receivers. For example, the other input receivers may enable a momentary preview of the icon as a cue to the user. In such an embodiment, the icon may be momentarily enlarged to provide a better view of the icon for the user. As discussed above, an audio cue may be played for the user to indicate the motion and/or orientation associated with the icon.

Figure 3:
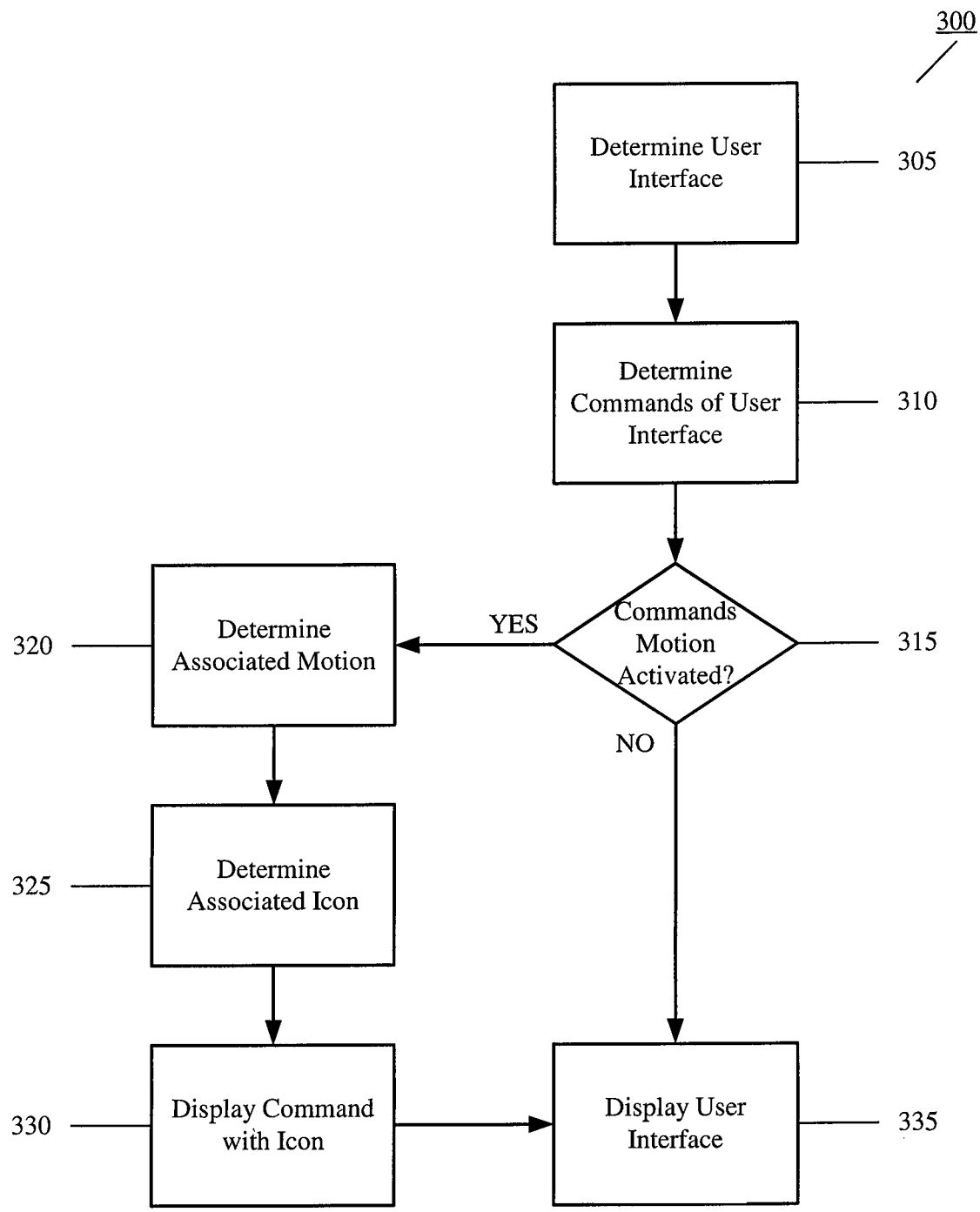
FIG. 3 shows a method of indicating a motion that activates a command according to an exemplary embodiment.

FIG. 3 shows a method 300 of indicating a motion and/or orientation that activates a command according to an exemplary embodiment. The method 300 may assume that the displayed icons of the user interface are already associated with motions and/or orientation and actions. The method 300 may also assume that only the motion and/or orientation is being used to perform the action. However, it should be noted that the other input receivers and/or factors may also be associated with the performing of the action. The method 300 will be discussed with reference to the MU 100 of FIG. 1 and the display 125 of FIG. 2.

In step 305, the processor 105 determines the user interface that will be displayed. As discussed above, the processor 105 performs conventional functionalities such as applications/programs of the MU 100. The application may include a user interface in which a user is allowed to enter inputs. In step 310, the processor 105 determines the commands that will be displayed with the user interface. For example, as shown in the display 125 of FIG. 2, the commands may include a first control 130, a second control 140, a back command 150, a home command 160, and a log in command 170.

In step 315, a determination is made whether any of the commands are motion and/or orientation activated. As discussed above, the MU 100 may be configured with the motion and/or orientation sensor 115 that receives sensor data that may be used to indicate whether an action is to be performed. The MU 100 may also be configured to enable the user to associate motions and/or orientations with the actions and/or have default settings of associated motions and/or orientations with actions. If at least one command is motion and/or orientation activated, the method 300 continues to step 320.

In step 320, the processor 105 accesses the CAM 120 to determine the associated motions and/or orientations with the respective commands. With reference to the display 125 of FIG. 2, the first control 130 has the associated motion of rolling the MU 100 to the right; the second control 140 has the associated motion of facing the MU 100 north; the back command 150 has the associated motion of shaking the MU 100 to the left; the home command 160 has the associated motion of moving the MU 100 up and down; and the log in command 170 has the associated motion of a personalized motion.

In step 325, the processor 105 accesses the CAM 120 to determine the associated icon with the associated motions and/or orientations of the respective commands. With reference to the display 125 of FIG. 2, the above identified motion for the first control 130 is associated with the icon 135; the above identified motion for the second control 140 is associated with the icon 145; the above identified motion for the back command 150 is associated with the icon 155; the above identified motion for the home command 160 is associated with the icon 165; and the above identified motion for the log in command 170 is associated with the icon 175.

In step 330, the processor 105 prepares the display of the command with the respective icon. Thus, in step 335, the display 125 shows the user interface including the commands with the associated icons. That is, the display 125 as illustrated in FIG. 2 is shown.

It should be noted that the user interface may include commands that do not have a motion and/or orientation associated therewith. That is, certain commands to be shown with the user interface may be activated using any other input entry such as touch data, mouse, stylus, etc. The method 300 accounts for such commands in the determination step 315 when these commands are simply shown on the display 125.

The exemplary embodiments provide an improved means of utilizing motion and/or orientation activated commands on a mobile unit. When the display of the mobile unit shows a user interface including a plurality of commands, each motion and/or orientation activated command is further displayed with an icon which indicates a motion and/or orientation that is performed to activate the command. The icon shows a user intuitive image to enable the user to determine the motion and/or orientation. The mobile unit may further be configured with other cues to indicate to the user the motion and/or orientation that is associated with activating the command.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A mobile unit, comprising:
    a processor;
    a memory;
    a display showing a user interface including a plurality of commands, a sensory activated command of the plurality of commands being shown with a respective icon selected from a library of icons that is filtered as a function of one or more sensory activated commands, wherein the respective icon is indicative of a selected orientation of the mobile unit assigned to the sensory activated command, and wherein the selection of the orientation of the mobile unit is filtered on a creation user interface to disable selection of some orientations that would lead to interference between commands; and
    a sensor sensing the orientation of the mobile unit, wherein the orientation of the mobile unit activates the corresponding sensory activated command.

2. The mobile unit of claim 1, wherein the sensory activated commands are associated with default orientations of the mobile unit and respective default icons.

3. The mobile unit of claim 1, wherein select ones of the sensory activated commands are associated with personalized motions and personalized icons.

4. The mobile unit of claim 1, further comprising:
    a speaker playing audio cues indicative of the orientation of the mobile unit.

5. The mobile unit of claim 1, wherein the sensor is one of an accelerometer, a magnetometer, a gyroscope, and a combination thereof.

6. The mobile unit of claim 1, further comprising:
    at least one further input receiving device, wherein the sensor and the at least one further input receiving device are used for activating the respective sensory activated command.

7. The mobile unit of claim 6, wherein the sensor includes a motion sensor and the at least one further input receiving device is a touch screen, wherein the motion sensor is operable to receive an initial touch data, an interim touch data, and an end touch data, whereupon the mobile unit then extrapolates the motion performed using the touch data on the touch screen.

8. The mobile unit of claim 7, wherein the processor compares a string of motions from the motion sensor to a plurality of motion templates stored in the memory to determine if the string is a match to any of the motion templates.

9. The mobile unit of claim 6, wherein the at least one further input receiving device is one of an environmental and biological sensor, and wherein the at least one further input receiving device and the sensor act in concert to select a sensory activated command.

10. The mobile unit of claim 1, further comprising:
    an input receiving device enabling a momentary enlarged view of the respective icon.

11. A method, comprising:
    displaying a user interface including a plurality of commands on a display of a mobile unit, a sensory activated command of the plurality of commands being shown with a respective sensory icon selected from a library of icons that is filtered as a function of one or more sensory activated commands, wherein the respective icon is indicative of a selected orientation of the mobile unit assigned to the sensory activated command, and wherein the selection of the orientation of the mobile unit is filtered on a creation user interface to disable selection of some orientations that would lead to interference between commands; and
    sensing the orientation of the mobile unit with a sensor, wherein the orientation of the mobile unit activates the corresponding sensory activated command.

12. The method of claim 11, wherein the orientation of the mobile unit is selected from a list of available orientations and the sensory icon is selected from a list of available icons.

13. The method of claim 12, wherein the selection of the orientation of the mobile unit is chosen from a gesture template.

14. The method of claim 12, wherein the orientation of the mobile unit is categorized into class types.

15. The method of claim 14, wherein the sensory icons are associated with a respective one of the class types.

16. The method of claim 14, wherein the list of available orientations and the list of available icons are filtered as a function of the class types for the selection of the orientation of the mobile unit and the sensory icon.

17. The method of claim 11, further comprising:
    generating a preview of the sensory icon.

18. The method of claim 11, wherein the user interface includes at least one further sensory activated command, each of the at least one further sensory activated command being shown with a respective further icon.

19. The method of claim 11, further comprising:
    enabling a momentary enlarged view of the respective icon.

* * * * *